(12) United States Patent
Kim et al.

(10) Patent No.: US 7,493,786 B2
(45) Date of Patent: Feb. 24, 2009

(54) METHOD FOR IMPLEMENTING LOGICAL MAC IN ETHERNET PASSIVE OPTICAL NETWORK SYSTEM

(75) Inventors: Jin-Hee Kim, Suwon-shi (KR); Do-Young Joung, Suwon-shi (KR); Whan-Jin Sung, Suwon-shi (KR); Soon-Ho Jang, Songnam-shi (KR); Min-Hyo Lee, Suwon-shi (KR); Shin-Hee Won, Seoul (KR); Tae-Sung Park, Suwon-shi (KR); Young-Seok Kim, Songnam-shi (KR)

(73) Assignee: Samsung Electronics Co., Ltd., Maetan-Dong, Yeongtong-Gu, Suwon-Si, Gyeonggi-Do, Korea (KR)

( * ) Notice: Subject to any disclaimer, the term of this patent is extended or adjusted under 35 U.S.C. 154(b) by 1182 days.

(21) Appl. No.: 10/690,330

(22) Filed: Oct. 21, 2003

(65) Prior Publication Data
US 2004/0184474 A1    Sep. 23, 2004

(30) Foreign Application Priority Data
Mar. 19, 2003    (KR) .................... 10-2003-0017072

(51) Int. Cl.
*H04J 3/16* (2006.01)
*H04L 12/28* (2006.01)

(52) U.S. Cl. ............................... 70/469; 370/392
(58) Field of Classification Search ............... 370/392, 370/395.51, 395.53, 466, 469, 471, 474; 398/45, 58, 63; 710/30
See application file for complete search history.

(56) References Cited

U.S. PATENT DOCUMENTS 7,274,695 B2 * 9/2007 Kim et al. .................. 370/389

2003/0117998 A1 * 6/2003 Sala et al. .................. 370/351

OTHER PUBLICATIONS

Dolors Sala; "EPON Layering;" IEEE 802.3AH Ethernet in the First Mile Task Force; Jul. 7, 2002; XP002366822.
Tae-Whan Yoo et al.; "Suggestion For The Layering Architecture;" IEEE.802.3AH Ethernet in the First Mile Task Force; Jul. 2002; XP002366823.
Jin Kim; "Authentication and Privacy in EPON;" IEEE 802.3AH Ethernet in the First Mile Task Force; Jul. 2002; XP002366824.
Ajay Gummalla; "EPON Compliance Architecture;" IEEE 802.3AH Ethernet in the First Mile Task Force; Jan. 2002; XP002238653.
Yukihiro Fujimoto et al.; "Layering of Point to Point Emulation;" IEEE 802.3AH Ethernet in the First Mile Task Force; Nov. 2001; XP002243927.
Dolors Sala et al.; "MPCP Baseline Proposal Architecture and Layering Model (II);" IEEE 802.3AH Ethernet in the First Mile Tas Force; May 13, 2002; XP002366825.

(Continued)

*Primary Examiner*—Aung S Moe
*Assistant Examiner*—Feben Haile
(74) *Attorney, Agent, or Firm*—Cha & Reiter, LLC (57) ABSTRACT

MAC (Media Access Control) for an EPON (Ethernet Passive Optical Network system) defined in an IEEE (Institute of Electrical and Electronics Engineers) 802.3ah EFM (Ethernet in the First Mile) standard is implemented using general MAC based on an IEEE 802.3 standard. LLID (Logical Link ID) information is inserted at a predetermined position of a frame outside its preamble and the frame containing the LLID information is transferred to a higher layer so that general MAC can be used as MAC for the EPON system. A physical layer of the EPON system contains LLID information within a preamble and transfers the preamble containing the LLID information. An RS (Reconciliation Sublayer) configures a new Ethernet frame by inserting the LLID information at a predetermined position of the Ethernet frame outside the preamble. The RS transfers the new Ethernet frame to a higher data link layer of the EPON system. The data link layer transfers the new Ethernet frame containing the LLID information.

14 Claims, 5 Drawing Sheets

OTHER PUBLICATIONS

Gerry Pesavento et al.; Ethernet Passive Optical Network (EPON) Architecture for Broadband Access; Optical Networks Magazine, vol. 4, No. 1; Jan. 2003; XP001162954.

IEEE; "Part 3: Carrier Sense Multiple Access with Collision Detection (CSMA/CD) Access Method and Physical Layer Specifications;"IEEE 802.3-2002; Mar. 8, 2002; XP002366826.

* cited by examiner

FIG.7

METHOD FOR IMPLEMENTING LOGICAL MAC IN ETHERNET PASSIVE OPTICAL NETWORK SYSTEM

CLAIM OF PRIORITY

This application claims priority to an application entitled "METHOD FOR IMPLEMENTING LOGICAL MAC IN ETHERNET PASSIVE OPTICAL NETWORK SYSTEM", filed in the Korean Intellectual Property Office on Mar. 19, 2003 and assigned Serial No. 2003-17072, the contents of which are hereby incorporated by reference.

BACKGROUND OF THE INVENTION

1. Field of the Invention

The present invention relates to a method for implementing MAC (Media Access Control) for an EPON (Ethernet Passive Optical Network) system defined in the IEEE (Institute of Electrical and Electronics Engineers) 802.3ah EFM (Ethernet in the First Mile) standard using general MAC based on an IEEE 802.3 standard.

2. Description of the Related Art

A PON (Passive Optical Network) system connects one OLT (Optical Line Termination) to a plurality of ONUs (Optical Network Units) using a 1×N ODN (Optical Distribution Network) to form a tree-type distribution topology.

The current IEEE 802.3ah EFM working group defined various functions necessary for an EPON (Ethernet Passive Optical Network) system. The three functions associated with MAC (Media Access Control) include an MPCP (Multi-Point Control Protocol) function, an OAM (Operation, Administration and Maintenance) function and an LLID (Logical Link ID) function. An LLID is positioned within a frame's preamble.

Figure 1:
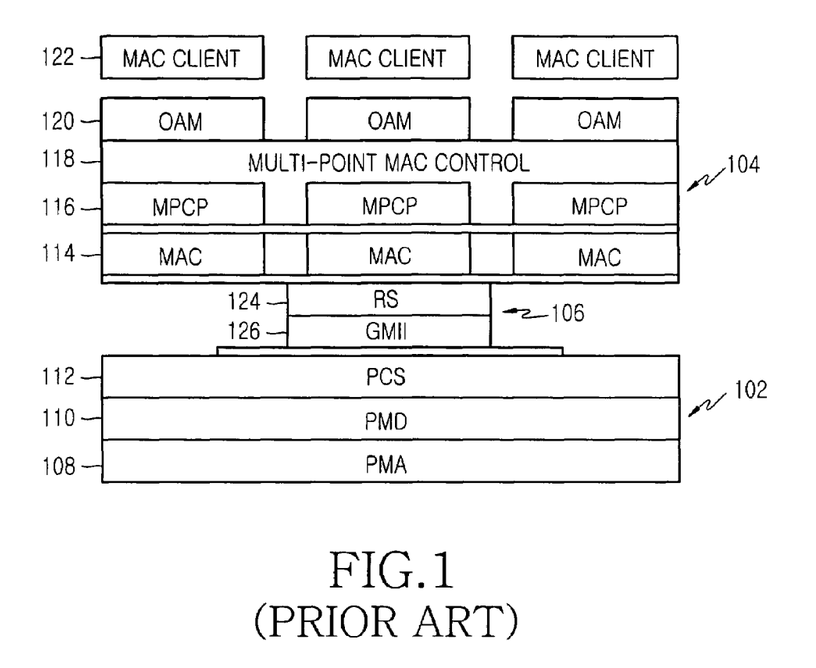
FIG. 1 is a view illustrating layers based on a layering baseline defined in an IEEE (Institute of Electrical and Electronics Engineers) 802.3ah EFM (Ethernet in the First Mile) standard.

Referring to FIG. 1, layers based on a currently standardized and defined layering baseline are classified into a physical layer 102, data link layers 104 and an interface layer 106. The physical layer includes a PMA (Physical Medium Attachment) layer 108, a PMD (Physical Medium Dependent) layer 110 and a PCS (Physical Coding Sublayer) 112. Each data link layer 104 includes a MAC layer 114, an MPCP layer 116, a MAC control layer 118 and an OAM layer 120, a MAC client 122 residing above the OAM layer. Here, the higher client 122 can be a router, a switch, a ULSLE (Upper Layer Shared LAN Emulation) processor, etc. The interface layer 106 arranged between the physical layer 102 and the data link layers 104 includes the RS 124 which is an 802.3 MAC-PLS (Physical Layer Signaling) interface layer and a GMII (Gbps Media Independent Interface) layer 126.

In actual implementation, however, the plurality of MAC layers 114 shown is implemented as a single physical MAC layer. Through logical MAC emulation, the MAC functions for the EPON are carried out by the single physical MAC layer 114.

The MPCP and OAM functions each must be implemented in a layer higher than a MAC layer 114. An LLID tagging/detagging function must be implemented by an RS (Reconciliation Sublayer) 124.

Here, LLID information of a preamble must be available in other higher layers so that the emulation can be performed as if the single physical MAC layer 114 corresponds to the plurality of logical MAC layers. For example, an error counter must be managed on the basis of each LLID, and a packet must be generated and processed according to the LLID.

In other words, when PON (Passive Optical Network) layers are actually implemented, the single physical MAC layer 114, the MPCP layer 116 and the OAM layer 120 are used, and contents associated with the layers are separated according to the LLID. Accordingly, when an interface function is performed according to a higher MAC client 122 and the LLID, the emulation function can be appropriately performed.

Figure 2:
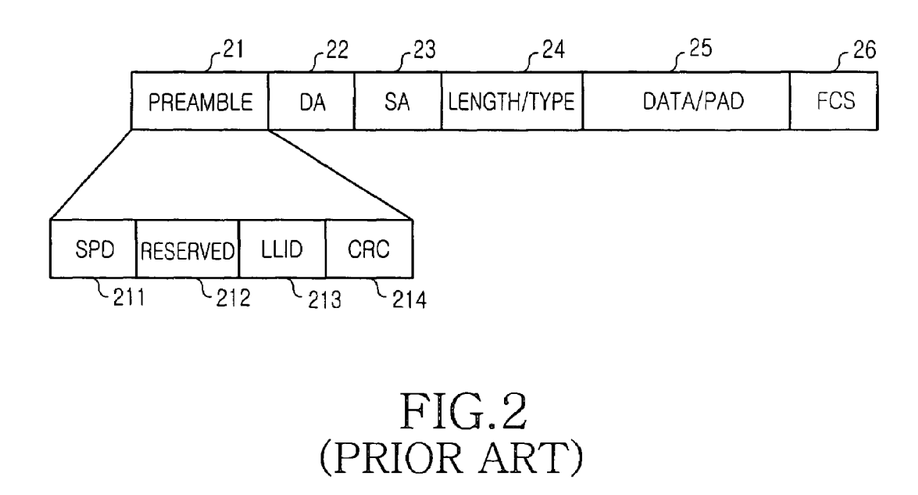
FIG. 2 is a view illustrating an exemplary format of an Ethernet frame based on the IEEE 802.3ah EFM standard.

FIG. 2 shows an exemplary format of an Ethernet frame based on the EFM standard. The frame includes an 8-byte preamble field 21, a 6-byte DA (Destination Address) field 22, a 6-byte SA (Source Address) field 23, a 2-byte L/T (Length/Type) field 24, a data/PAD (Packet Assembly and Disassembly) field 25 indicating frame data, and an FCS (Frame Check Sequence) field 26 which is arranged at the end of the frame and used for checking an error when information divided on a frame-by-frame basis is sent in data communication. The preamble field 21 includes a 3-byte SPD field 211, a 2-byte reserved field 212, a 2-byte LLID field 213 and a 1-byte CRC (Cyclical Redundancy Check) field 214.

Figure 3:
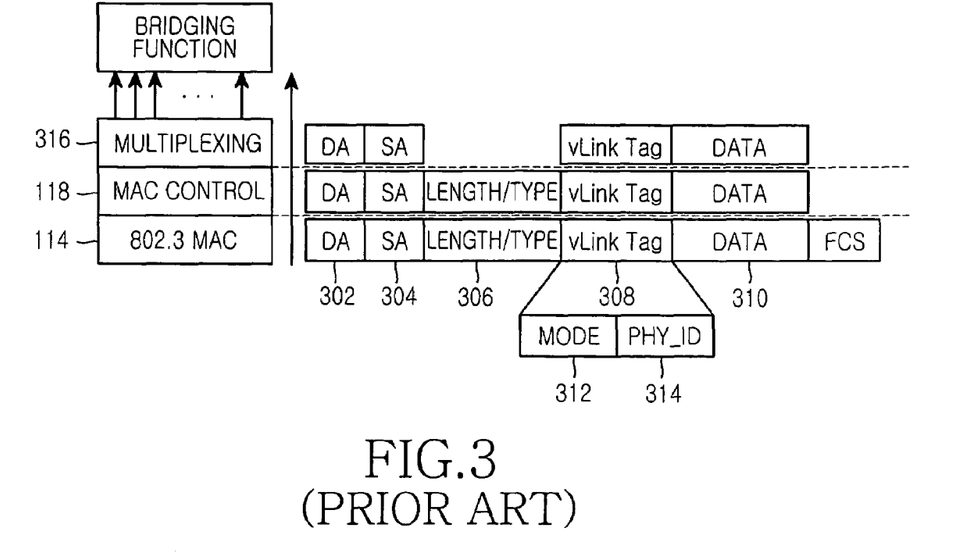
FIG. 3 is a view illustrating the conventional architecture for transferring a PON tagging Ethernet frame between layers.

FIG. 3 shows the conventional architecture for transferring a PON tagging Ethernet frame between layers, as disclosed in an application entitled "ETHERNET PASSIVE OPTICAL NETWORK SYSTEM (SAMSUNG ELECTRONICS CO., LTD.)", filed in the Korean Industrial Property Office and assigned Serial No. 2002-35470.

In detail, the MAC layer 114 performs a basic operation for a frame transferred from the physical layer 102, and then a DA field 302, an SA field 304, an L/T field 306, a vLink tag field 308 and a data field 310 contained in the frame are transferred up to the MAC control layer 118 which first confirms the L/T field. Where a corresponding frame is a user frame, the L/T field 306 indicates a length value of the frame. In the case of the user frame, the MAC control layer 118 performs no operation, and transfers the DA field 302, the SA field 304 and the data field 310 to a higher layer.

At this time, the vLink tag field 308 is transferred as the user data field. The multiplexing layer 316 combines MAC addresses within the DA and SA fields 302, 304 and mode 312 and PHY_ID 314 data within the vLink tag field 308, and performs an appropriate reflection or forwarding operation according to a result of the combination. At this time, as the vLink tag field 308 follows the L/T field 306, the multiplexing layer 316 regards the vLink tag field 308 as general user data. The multiplexing layer transfers the vLink tag field 308 to a higher layer.

Further, a PHY_ID value 314 within the vLink tag field 308 varies with each mode. Where the mode is a P2P (Point-To-Point) mode, a PHY_ID value 314 of the destination is assigned. On the other hand, where the mode is an SCB (Single Copy Broadcasting) mode, a PHY_ID value 314 of an ONU transmitting a frame to a corresponding OLT is assigned. This assignment method is equally applicable to a downstream transmission.

The LLID information is contained in the preamble 21 of the Ethernet frame according to the current EFM standard shown in FIG. 2 and the preamble containing the LLID information 213 is transferred to a lower layer. In transferring the Ethernet frame to a higher layer, the preamble is removed. Problematically, the LLID information is therefore unavailable to the higher layer, and consequently a single MAC layer cannot be emulated.

SUMMARY OF THE INVENTION

In one aspect of the present invention, a method is provided for implementing logical MAC in an EPON system, and a computer-readable recording medium is provided for recording a program for implementing the method, which inserts LLID (Logical Link ID) information at a predetermined position of a frame outside its preamble and transfer the frame containing the LLID information to a higher layer. Accordingly, general MAC can be used as MAC for the EPON.

In another aspect of the present invention, the method and recorded medium are each configured to be compatible with an EFM (Ethernet in the First Mile) standard using general MAC.

In yet another aspect of the present invention, the method and recorded medium each enable logical MAC emulation by transferring LLID (Logical Link ID) information to a higher layer rather than a physical layer.

The above and other aspects are accomplished by a method for implementing MAC in an Ethernet passive optical network system, comprising the step of: configuring an Ethernet frame to be transferred between a physical layer and a data link layer, the Ethernet frame comprising: a preamble, a DA (Destination Address) field for indicating a destination address; an SA (Source Address) field for indicating a source address; an L/T (Length/Type) field for indicating the Ethernet frame's length and type; a data/PAD (Packet Assembly and Disassembly) field for indicating data of the Ethernet frame; and an FCS (Frame Check Sequence) field which is positioned at an end of each frame and used for detecting the frame's error when information divided on a frame-by-frame basis is transmitted in data communication; and reconfiguring the frame with, as an additional field, an LLID (Logical Link ID) field for indicating a logical link identifier, wherein the reconfigured frame is transferred to the data link layer so that the data link layer uses the LLID field to enable logical MAC emulation.

In accordance with another aspect of the present invention, there is provided a method for implementing MAC (Media Access control) in an Ethernet passive optical network system, comprising the steps of: (a) causing a physical layer of the Ethernet passive optical network system to contain LLID (Logical Link ID) information within a preamble and transfer the preamble containing the LLID information; (b) causing an RS (Reconciliation Sublayer) to configure a new Ethernet frame with the preamble by inserting the LLID information at a predetermined position of an Ethernet frame outside the preamble, and causing the RS to transfer the new Ethernet frame to a higher data link layer of the Ethernet passive optical network system; and (c) causing the data link layer to transfer the new Ethernet frame containing the LLID information.

In accordance with yet another aspect of the present invention, there is provided a method for implementing MAC (Media Access control) in an Ethernet passive optical network system, comprising the steps of: (a) causing a data link layer of the Ethernet passive optical network system to transfer an Ethernet frame containing LLID (Logical Link ID) information; (b) causing an RS (Reconciliation Sublayer) to extract the LLID information contained in the Ethernet frame and configure a standard-based Ethernet frame by containing the LLID information within a preamble, and causing the RS to transfer the standard-based Ethernet frame to a lower physical layer of the Ethernet passive optical network system; and (c) causing the physical layer to transfer the preamble containing the LLID information.

BRIEF DESCRIPTION OF THE DRAWINGS

The above and other aspects, features and other advantages of the present invention will be more clearly understood from the following detailed description taken in conjunction with the accompanying drawings, in which the same or similar elements are annotated with identical reference numerals through the several views.

DETAILED DESCRIPTION OF THE PREFERRED EMBODIMENTS

In the following description, preferred embodiments of the present invention will be described in detail with reference to the annexed drawings, unneeded detailed description of known functions and configurations being omitted for clarity.

Figure 4A:
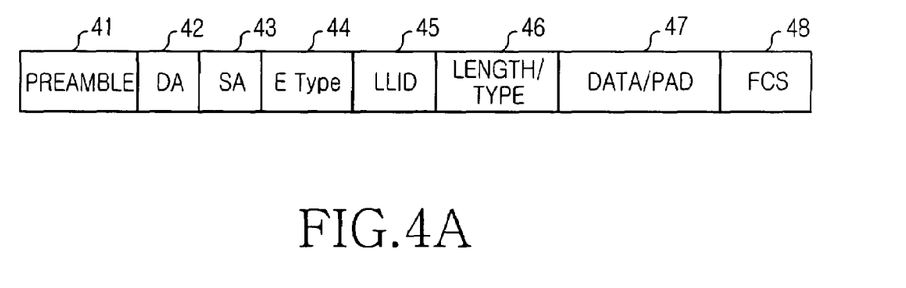
FIGS. 4A and 4B are views explaining a logical MAC (Media Access Control) implementation method for transferring LLID (Logical Link ID) information to a higher layer in accordance with one embodiment of the present invention.
Figure 4B:
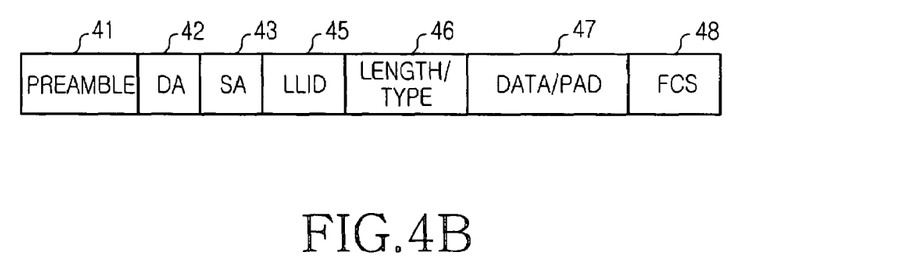

FIGS. 4A and 4B are views explaining a logical MAC implementation method for transferring LLID (Logical Link ID) information to a higher layer in accordance with one embodiment of the present invention. The LLID in the Ethernet frame to be transferred is contained at a predetermined position of the Ethernet frame outside its preamble.

In detail, the Ethernet frame in accordance with the present invention, differing from the FIG. 2 frame format, includes an 8-byte preamble field 41, a 6-byte DA (Destination Address) field 42, a 6-byte SA (Source Address) field 43, a 2-byte E type field 44 indicating information of an Ether type or "E type" (i.e., mode), a 2-byte LLID (Logical Link ID) field 45, a 2-byte L/T (Length/Type) field 46, a data/PAD (Packet Assembly and Disassembly) field 47 indicating frame data, and an FCS (Frame Check Sequence) field 48 which is arranged at the end of the frame and used for checking an error when information divided on a frame-by-frame basis is sent in data communication.

As shown in FIG. 4B, the E type field 44 can be removed from the Ethernet frame. In other words, the method of the present invention extracts the LLID information from the preamble field 41 and inserts the LLID information at a predetermined position of the Ethernet frame outside the preamble field 41 to transmit the Ethernet frame having the inserted LLID information to an MPCP (Multi-Point Control Protocol) or OAM (Operation, Administration and Maintenance) layer which is a higher layer and a MAC client through the general MAC. The E type does not need to be newly defined.

As the LLID field 45 is contained in the frame, the LLID information is transferred together when the frame is transferred to the higher layer. Consequently, when a PON (Passive Optical Network) system's layers are implemented according to the inventive new frame format, although the single physical MAC layer, the MPCP layer and the OAM layer are used, contents associated with the layers are separated according to the LLID to realize the emulation of a plurality of physical MAC layers.

In the second embodiment of the present invention, described below in connection with FIG. 5, the layering differs from that of FIG. 1 in that the data link layer 104 includes the multiplexing layer 316, residing above the OAM layer 120, and in that the MAC layer 114, the MPCP layer 116, the MAC control layer and the OAM layer 120 are all configured to emulate single respective layers. The second embodiment proposes a new logical MAC implementation method designed to overcome possible incompatibility with the existing standard.

Figure 5:
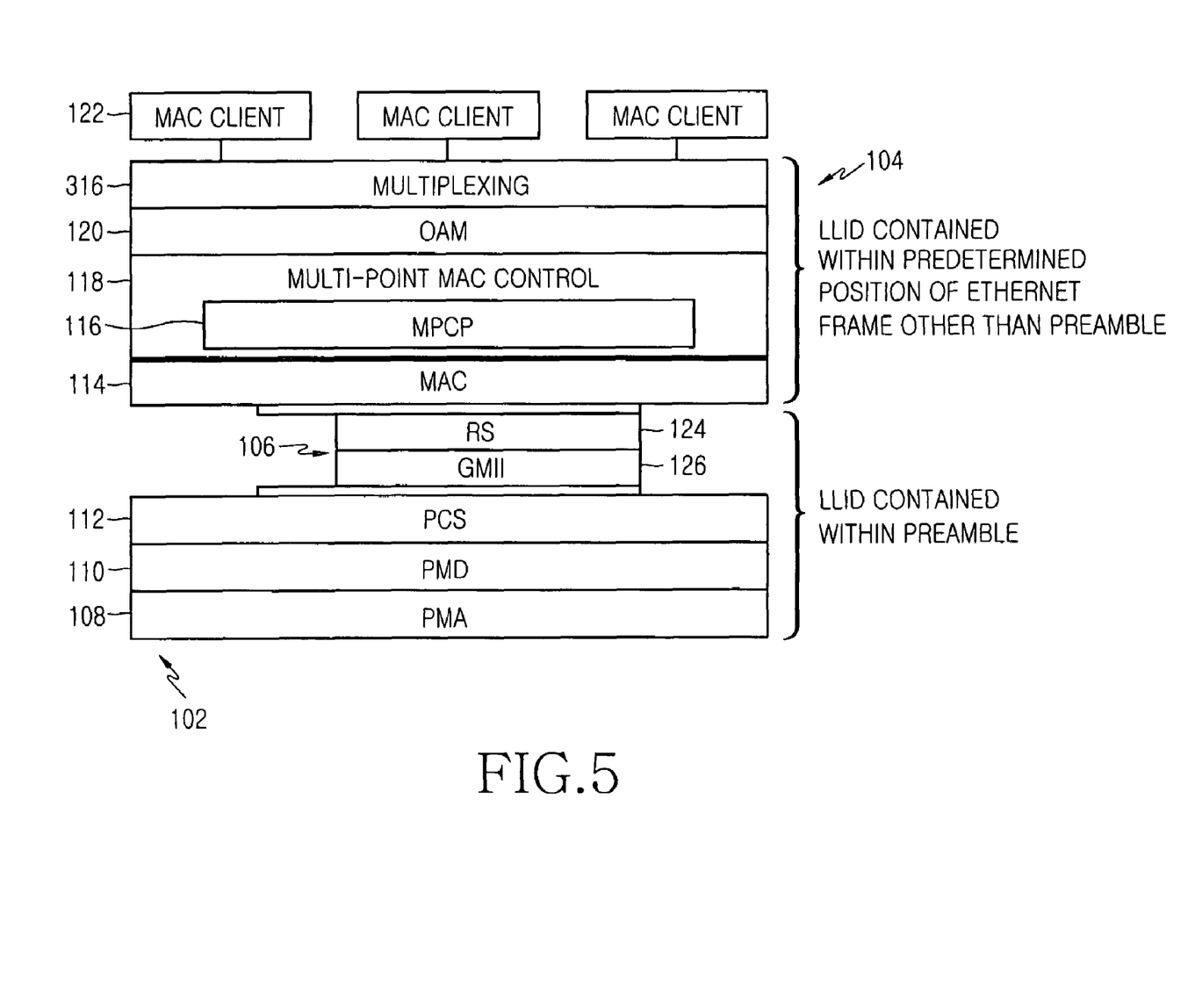
FIG. 5 is a view explaining the logical MAC implementation method for transferring the LLID information to the higher layer in accordance with another embodiment of the present invention.

As shown in FIG. 5, layers according to the standardized and defined layering baseline are classified into a physical layer, a data link layer and an interface layer. The physical layer includes a PMA (Physical Medium Attachment) layer, a PMD (Physical Medium Dependent) layer and a PCS (Physical Coding Sublayer). The data link layer includes a MAC layer, an MPCP layer, a MAC control layer, an OAM layer and a multiplexing layer. The interface layer arranged between the physical layer and the data link layer, includes an RS (Reconciliation Sublayer) being an 802.3 MAC-PLS (Physical Layer Signalling) interface layer and a GMII (Gbps Media Independent Interface) layer.

In accordance with the embodiment of the present invention, the physical layer consisting of the PMA and PCS layers and the interface layer consisting of the RS and GMII layers have the Ethernet frame containing the LLID information within the preamble as shown in FIG. 2. The data link layer consisting of the MAC layer, the MPCP layer, the MAC control layer, the OAM layer and the multiplexing layer has the LLID information within a predetermined position of the Ethernet frame other than the preamble as shown in FIGS. 4A and 4B. Since the LLID information for a lower layer than the MAC Layer exists within the preamble in accordance with the embodiment of the present invention, the present invention is compatible with the 802.3ah EFM standard. On the other hand, as the LLID information for the RS and the MAC client exists within the predetermined position of the frame other than the preamble, the emulation associated with the MAC for the EPON can be easily performed using the existing 802.3 MAC. The RS converts the Ethernet frame.

The potential incompatibility would arise since the physical layer contains the LLID information within the preamble of the Ethernet frame so that the Ethernet frame can be configured as shown in FIG. 2 whereas the MAC layer (contained in the data link layer) or another higher layer contains the LLID information at a predetermined position of the Ethernet frame outside the preamble so that the Ethernet frame can be configured according to the existing standard as shown in FIGS. 4A and 4B.

To bridge this difference, an RS (Reconciliation Sublayer) converts the Ethernet frame according to a frame conversion method as described below by the flow charts in FIGS. 6 and 7.

Figure 6:
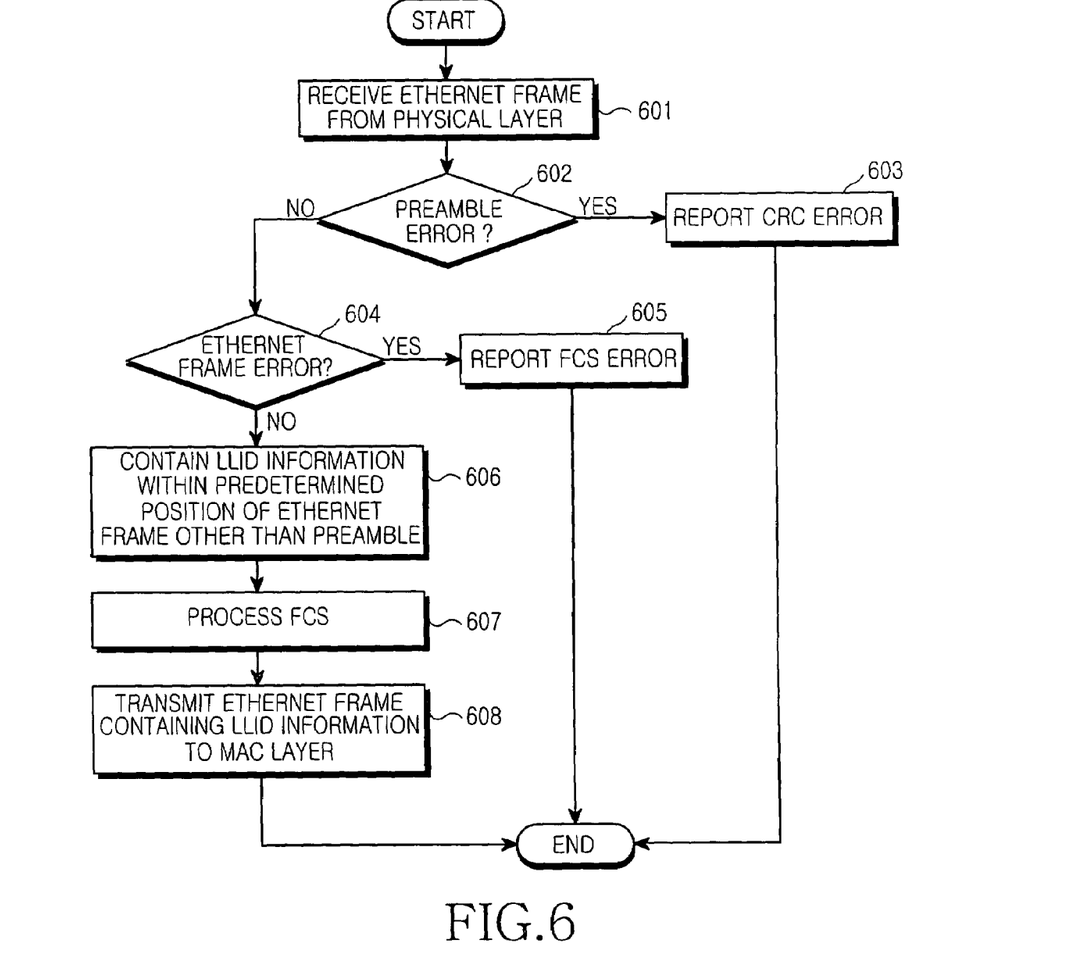
FIG. 6 is a flow chart illustrating an upstream frame conversion procedure in a frame conversion method performed by an RS (Reconciliation Sublayer) in accordance with the present invention.

FIG. 6 is a flow chart illustrating an upstream frame conversion procedure in a frame conversion method performed by the RS in accordance with the present invention. In the reconfiguration process, the RS receives an Ethernet packet from the PCS layer contained in the physical layer and reconfigures the LLID information at step 601.

Then, the RS determines from the CRC (Cyclical Redundancy Check) field of the preamble whether the preamble of the Ethernet packet has an error at step 602. If an error is determined to exist at the above step 602, the RS discards the received Ethernet packet and reports the error detected through a CRC operation at step 603. On the other hand, if the determination is that no error exists in the preamble, the RS determines from the FCS field of the Ethernet frame of the Ethernet packet whether an error exists in the DA and FCS fields, etc. contained in the Ethernet frame at step 604. If an error exists within the Ethernet frame, the RS reports an FCS error to a higher layer at step 605. On the other hand, if no error exists within the Ethernet frame, the RS configures a new Ethernet frame containing the LLID information at the predetermined position of the frame outside the preamble as shown in FIGS. 4A and 4B at step 606. The RS processes an FCS according to the configuration of the MAC layer 114 at step 607.

In other words, if the FCS associated with the general MAC is disabled, the RS transfers the Ethernet packet to the higher layer (i.e., the MAC layer) without updating the FCS at step 608. Otherwise, if the FCS associated with the general MAC is enabled, the RS newly produces the FCS and inserts the newly produced FCS into the Ethernet packet. Then, the RS transfers the Ethernet packet to the higher layer (i.e., the MAC layer) at step 608.

Figure 7:
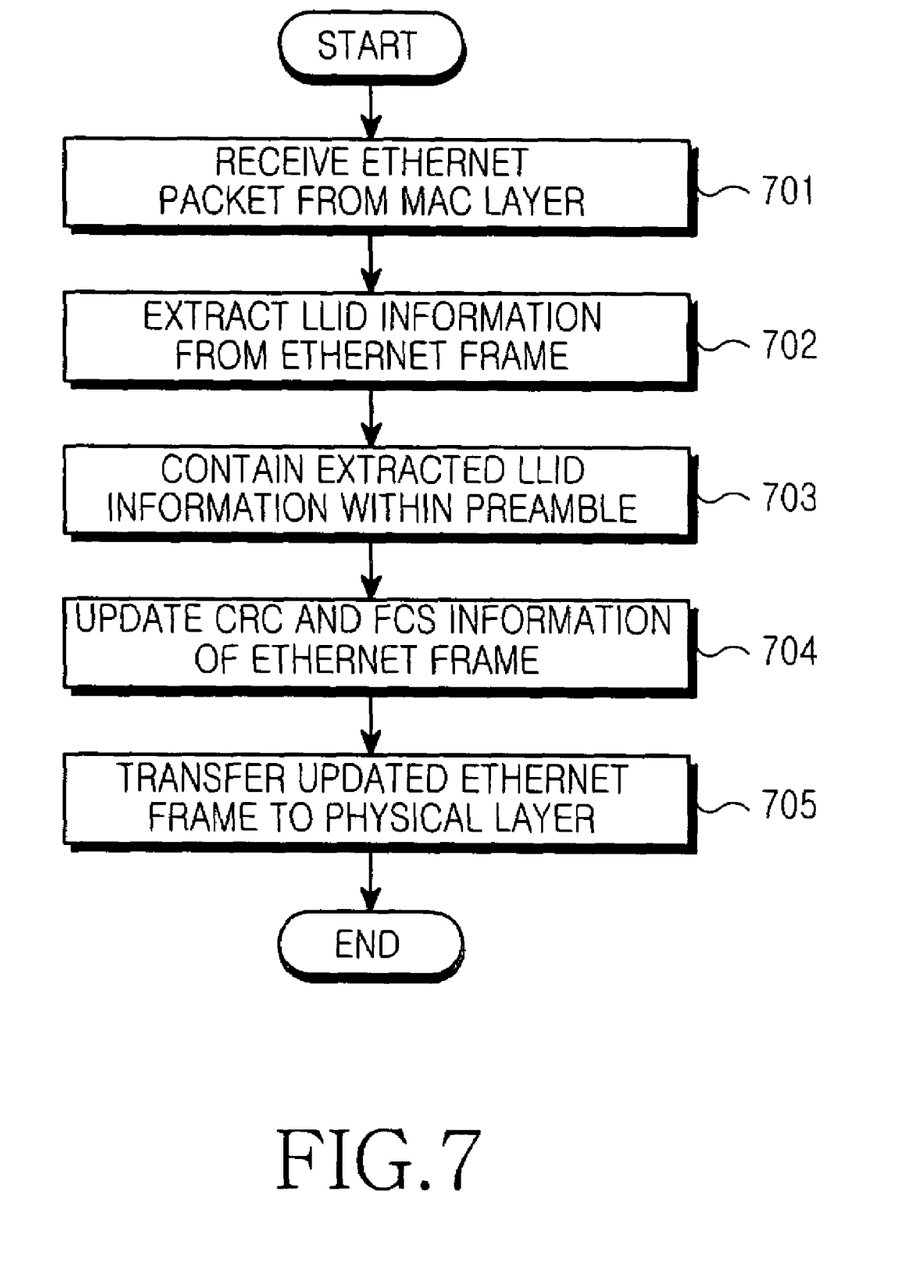
FIG. 7 is a flow chart illustrating a downstream frame conversion procedure in a frame conversion method performed by the RS in accordance with the present invention.

FIG. 7 is a flow chart illustrating a downstream frame conversion procedure in a frame conversion method performed by the RS in accordance with the present invention. The RS reconfigures the LLID information when the downstream transmission is carried out from the MAC layer to the physical layer. At this time, the RS receives an Ethernet packet from the general MAC layer at step 701. The RS extracts the LLID information from an Ethernet frame of the received Ethernet packet at step 702 and then inserts the extracted LLID information within the preamble at step 703. The RS then produces the preamble's CRC information and the Ethernet frame's FCS information, and updates the CRC within the preamble and FCS information within the Ethernet frame at step 704. The RS transfers the updated Ethernet packet to the PCS layer contained in the physical layer at step 705.

In accordance with the present invention, LLID (Logical Link ID) information can be contained at a predetermined position of the frame outside the preamble, and the frame containing the LLID information can be transferred to a higher layer so that general MAC can be used as MAC for an EPON system.

Further, the present invention is compatible with an EFM (Ethernet in the First Mile) standard using the general MAC.

Furthermore, the present invention enables logical MAC emulation by transferring the LLID information to a higher layer rather than a physical layer.

The above-described method of the present invention can be implemented in the form of a computer-readable program, so that it can be stored on a recording medium such as a CD-ROM (Compact Disc-Read Only Memory), a floppy disc, a hard disc, a magneto-optical disc or etc.

Although the preferred embodiments of the present invention have been disclosed for illustrative purposes, those skilled in the art will appreciate that various modifications, additions and substitutions are possible, without departing from the scope of the invention. Therefore, the present invention is not limited to the above-described embodiments, but the present invention is defined by the claims, which follow along with their full scope of equivalents.

What is claimed is:

1. A method for implementing MAC (Media Access control) in an Ethernet passive optical network system, the method comprising the steps of:
   (a) causing a physical layer of the Ethernet passive optical network system to contain LLID (Logical Link ID) information within a preamble and transfer the preamble containing the LLID information;
   (b) causing an RS (Reconciliation Sublayer) to configure a new Ethernet frame with said preamble and by inserting the LLID information at a predetermined position of the Ethernet frame outside said preamble, and causing the RS to transfer the new Ethernet frame up to a data link layer of the Ethernet passive optical network system; and
   (c) causing said data link layer to transfer said new Ethernet frame;
   wherein step (b) comprises the steps of:
   determining whether an error exists within the preamble and Ethernet frame; and
   if no error exists within the preamble and Ethernet frame, extracting the LLID information contained in the preamble and configuring the new Ethernet frame inserting the LLID information at a predetermined position of the Ethernet frame outside the preamble.

2. The method as set forth in claim 1, wherein, the new Ethernet frame comprises:
   a DA (Destination Address) field for indicating a destination address;
   a SA (Source Address) field for indicating a source address;
   a LLID field for indicating a logical link identifier;
   a L/T (Length/Type) field for indicating a type and length of the Ethernet frame;
   a data/PAD (Packet Assembly and Disassembly) field for indicating data of the Ethernet frame; and
   a FCS (Frame Check Sequence) field which is positioned at an end of the frame and used for detecting an error of the frame when information divided on a frame-by-frame basis is transmitted in data communication,
   wherein the frame in which the LLID field is positioned is transferred to the data link layer so that the data link layer enables logical MAC emulation.

3. The method as set forth in claim 2, wherein the step (b) comprises the steps of:
   (b-1) causing the RS to receive an Ethernet packet from the physical layer;
   (b-2) causing the RS to determine whether an error exists within the preamble of the Ethernet packet received at the step (b-1);
   (b-3) if an error exists within the preamble as a result of the determination at the step (b-2), discarding the Ethernet packet and reporting the error of the preamble;
   (b-4) if no error exists w/thin the preamble as the result of the determination at the step (b-2), determining whether an error exists within the Ethernet frame of the Ethernet packet;
   (b-5) if an error exists within the Ethernet frame as a result of the determination at the step (b-4), reporting the error of the Ethernet frame; and
   (b-6) processing the FCS of the new Ethernet frame and transferring a new Ethernet packet.

4. The method as set forth in claim 3, wherein, if the FCS is disabled, the step (b-7) is carried out by transferring the new Ethernet packet to a higher layer without updating the FCS.

5. The method as set forth in claim 3, wherein, if the FCS is enabled, the step (b-7) is carried out by updating the FCS, inserting the updated FCS into the new Ethernet frame and transferring the new Ethernet packet to a higher layer.

6. The method as set forth in claim 2, wherein the new Ethernet frame further comprises an E type field for indicating information of an Ether type.

7. The method as set forth in claim 6, wherein the step (b) comprises the steps of:
   (b-1)) causing the RS to receive an Ethernet packet from the physical layer;
   (b-2) causing the RS to determine whether an error exists within the preamble of the Ethernet packet received at the step (b-1);
   (b-3) if an error exists within the preamble as a result of the determination at the step (b-2), discarding the Ethernet packet and reporting the error of the preamble;
   (b-4) if no error exists w/thin the preamble as the result of the determination at the step (b-2), determining whether an error exists within the Ethernet frame of the Ethernet packet;
   (b-5) if an error exists within the Ethernet frame as a result of the determination at the step (b-4), reporting the error of the Ethernet frame; and
   (b-6) processing the FCS of the new Ethernet frame and transferring a new Ethernet packet.

8. The method as set forth in claim 7, wherein, if the FCS is disabled, the step (b-7) is carried out by transferring the new Ethernet packet to a higher layer without updating the FCS.

9. The method as set forth in claim 7. wherein, if the FCS is enabled, the step (b-7) is carried out by updating the FCS, inserting the updated FCS into the new Ethernet frame and transferring the new Ethernet packet to a higher layer.

10. A method for implementing MAC (Media. Access control) in an Ethernet passive optical network system, comprising the steps of:
    (a) causing a data link layer of the Ethernet passive optical network system to transfer an Ethernet frame containing LLID (Logical Link I-D) information;
    (b) causing an RS (Reconciliation Sublayer) to extract the LLID information contained in the Ethernet frame and configure a standard-based Ethernet flame by inserting the LLID information in a preamble, and causing the RS to transfer the standard-based Ethernet flame to a lower physical layer of the Ethernet passive optical network system; and
    (c) causing the physical layer to transfer the preamble containing the LLID information;
    wherein step (b) comprises the steps of:
    producing the FCS associated with the standard-based Ethernet frame from which CRC information and the LLID information are removed, and
    updating the CRC and LLID information within the standard-based Ethernet frame.

11. The method as set forth in claim 10, wherein, the Ethernet frame containing LLID information comprises:
    a DA (Destination Address) field for indicating a destination address;
    a SA (Source Address) field for indicating a source address;
    a LLID field for indicating a logical link identifier;
    a L/T (Length/Type) field for indicating the Ethernet frame's length and type;
    a data/PAD (Packet Assembly and Disassembly) field for indicating data of the Ethernet frame; and
    a FCS (Frame Check Sequence) field which is positioned at an end of the frame and used for detecting an error of the frame when information divided on a frame-by-frame basis is transmitted in data communication, wherein said frame containing LLID information is transferred to the data link layer so that the data link layer uses the LLID field to enable logical MAC emulation.

12. The method as set forth in claim 11, wherein the step (b) comprises the steps of:
   (b-1) causing the KS to receive the Ethernet frame from the physical layer;
   (b-2) causing the RS to extract the LLID information from the received Ethernet frame and insert the extracted LLID information within the preamble; and
   (b-3) transferring the Ethernet packet with the standard-based Ethernet frame containing the updated CRC and FOS information to the physical layer.

13. The method as set forth in claim 11, wherein said Ethernet frame containing LLID information further comprises an E type field for indicating information of an Ether type.

14. The method as set forth in claim 13, wherein the step (b) comprises the steps of:
   (b-1) causing the KS to receive the Ethernet frame from the physical layer;
   (b-2) causing the RS to extract the LLID information from the received Ethernet frame and insert the extracted LLID information within the preamble; and
   (b-3) transferring the Ethernet packet with the standard-based Ethernet frame containing the updated CRC and FCS information to the physical layer.

* * * * *

UNITED STATES PATENT AND TRADEMARK OFFICE
CERTIFICATE OF CORRECTION

| | | |
|---|---|---|
| PATENT NO. | : 7,493,786 B2 | Page 1 of 1 |
| APPLICATION NO. | : 10/690330 | |
| DATED | : February 24, 2009 | |
| INVENTOR(S) | : Jin-Hee Kim et al. | |

It is certified that error appears in the above-identified patent and that said Letters Patent is hereby corrected as shown below:

On the Title Page

Item 75, first inventor should read
--…Inventors: Jin-Hee Kim, Suwon-shi (USA)…--

Signed and Sealed this
Thirteenth Day of May, 2014

Michelle K. Lee
*Deputy Director of the United States Patent and Trademark Office*